(12) United States Patent
Kabra et al.

(10) Patent No.: US 6,507,834 B1
(45) Date of Patent: Jan. 14, 2003

(54) METHOD AND APPARATUS FOR PARALLEL EXECUTION OF SQL FROM STORED PROCEDURES

(75) Inventors: Navin Kabra, Madison, WI (US); Jignesh M. Patel, Ann Arbor, MI (US); Jie-Bing Yu, Carlsbad, CA (US); Biswadeep Nag, Fremont, CA (US); Jian-Jun Chen, Madison, WI (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/470,927

(22) Filed: Dec. 22, 1999

(51) Int. Cl.[7] .............................................. G06F 17/30
(52) U.S. Cl. ................... 707/2; 703/3; 703/4; 703/102; 703/104.1
(58) Field of Search ........................... 707/2, 3, 4, 102, 707/104.1

(56) References Cited

U.S. PATENT DOCUMENTS

| | | | |
|---|---|---|---|
| 5,553,234 A | | 9/1996 | Cotner et al. |
| 5,574,900 A | * | 11/1996 | Huang et al. ................... 707/1 |
| 5,835,755 A | * | 11/1998 | Stellwagen, Jr. ............. 707/10 |
| 5,873,075 A | * | 2/1999 | Cochrane et al. .............. 707/2 |
| 6,009,265 A | * | 12/1999 | Huang ............................ 707/2 |
| 6,205,465 B1 | * | 3/2001 | Schoening et al. ......... 709/102 |
| 6,208,990 B1 | * | 3/2001 | Suresh et al. .................. 707/6 |
| 6,324,683 B1 | * | 11/2001 | Fuh et al. ....................... 717/4 |

FOREIGN PATENT DOCUMENTS

EP         1111516 A   *   6/2001    ........... G06F/17/30

* cited by examiner

*Primary Examiner*—Frantz Coby
(74) *Attorney, Agent, or Firm*—Gates & Cooper

(57) ABSTRACT

A method, apparatus, and an article of manufacture for parallel execution of SQL operations from stored procedures. One or more embodiments of the invention provide the stored procedure (stored procedure) with a C++ class (hereinafter referred to as "dispatcher") that can take an SQL query and start parallel execution of the query. The query is optimized and parallelized. The dispatcher executes the query, sets up the communication links between the various operators in the query, and ensures that all the results are sent back to the data-server that originated the query request. Further, the dispatcher merges the results of the parallel execution and produces a single stream of tuples that is fed to the calling stored procedure. To provide the single stream to the calling stored procedure, one or more embodiments of the invention utilize a class that provides the stored procedure with a simple and easy-to-use interface to access the results of the nested SQL execution.

15 Claims, 8 Drawing Sheets

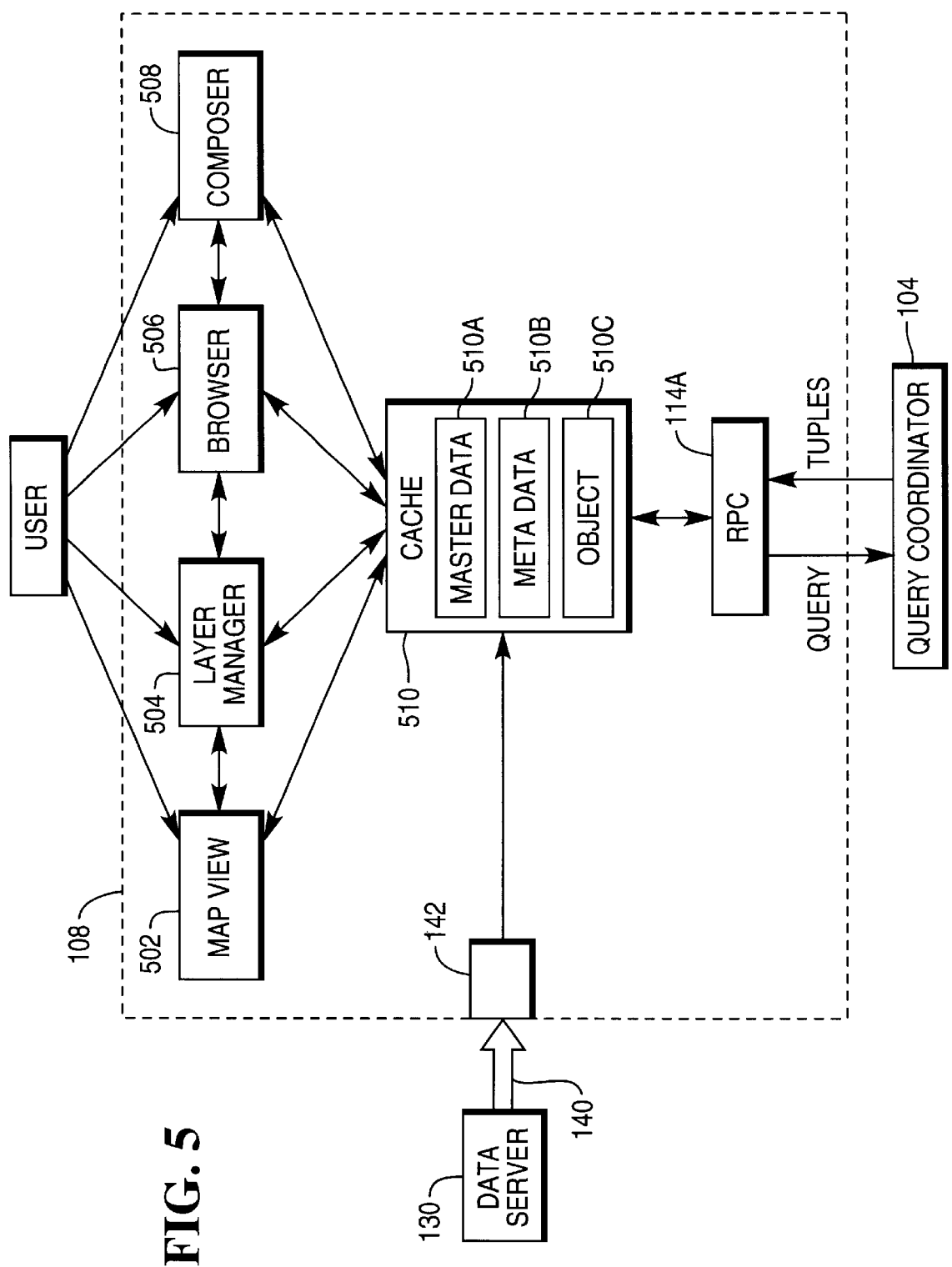

METHOD AND APPARATUS FOR PARALLEL EXECUTION OF SQL FROM STORED PROCEDURES

CROSS REFERENCE TO RELATED APPLICATIONS

This application is related to the following co-pending and commonly assigned patent applications, which are incorporated by reference herein:

Application Ser. No. 09/470,215, entitled "METHOD AND APPARATUS FOR PARALLEL EXECUTION OF SQL FROM WITHIN USER DEFINED FUNCTIONS" filed on the same date herewith, by Navin Kabra, Jignesh Patel, Jie-Bing Yu, Biswadeep Nag, and Jian-Jun Chen, now pending.

Application Ser. No. 09/449,704, entitled "METHOD AND APPARATUS FOR FETCHING ARRAY BASED OBJECTS BY DIRECT DELIVERY AND BATCHING" filed on Nov. 24, 1999, by Zhe Wang, Biswadeep Nag, Jie-Bing Yu, and Jignesh Patel, now pending.

Application Ser. No. 09/449,085, entitled "QUERY MONITOR PLAYBACK MECHANISM FOR POST-MORTEM PERFORMANCE ANALYSIS" filed on Nov. 24, 1999, by Jie-Bing Yu, Jun Li, and Karthikeyan Ramasamy, now pending.

BACKGROUND OF THE INVENTION

1. Field of the Invention

The present invention relates to systems and methods for performing queries on data stored in a database, and in particular to a method and system for executing SQL from stored procedures.

2. Description of the Related Art

The ability to manage massive amounts of information has become a virtual necessity in business today. The information and data are often stored in related files. A set of related files is referred to as a database. A database management system DBMS) creates and manages one or more databases. Today, DBMSs can manage any form of data including text, images, sound and video. Further, large-scale integrated DBMS' provide an efficient, consistent, and secure means for storing and retrieving the vast amounts of data.

Certain computer languages have been developed and utilized to interact with and manipulate the data. For example, SQL (Structured Query Language) is a language used to interrogate and process data in a relational database (a database in which relationships are established between files and information stored in the database). Originally developed for mainframes, most database systems designed for client/sever environments support SQL. SQL commands can be used to interactively work with a database or can be embedded within a programming language to interface to a database. Thus, methods and functions may embed and utilize SQL commands.

Stored Procedures

Users/programmers often need to invoke the same set of commands (or the same set of commands with different parameters) at varying times and locations of a program. In such a situation, the query may be placed into a stored procedure. A stored procedure is a batch of SQL statements stored in a database/on a server, that may be partially or fully processed/compiled before it is stored (or upon its first invocation). Additionally, a stored procedure is a method or procedure written in any programming language that is partially or fully processed/compiled before it is stored (or upon its first invocation).

Stored procedures may be called directly from a client or from a database trigger and are often stored on the server. A database trigger is a user defined mechanism that causes a stored procedure to automatically initiate and execute upon the occurrence of the user specified events in the database (i.e., when the trigger "fires"). Thus, the trigger will not "fire" unless the event(s) specified by the user occurs. For example, a user may define a trigger to automatically "fire" whenever a user updates, deletes, or inserts data.

Since the stored procedure is stored on a server, the stored procedure is available to all clients and does not need to be replicated in each client. Further, by storing the stored procedure on the server, when the stored procedure is modified, all clients automatically get/have access to the new version. This saves programming effort especially when different client user interfaces and development systems are used. Further, this allows stored procedures to be an easy mechanism for sharing complex queries and functions between multiple applications. Additionally, SQL and stored procedures may call other stored procedures and may be written independently from (and without knowledge of) the underlying DBMS.

A stored procedure may be partially or completely processed/compiled before it is stored on the database. Consequently, the stored procedure does not have to be parsed and compiled each time it is invoked. Further, because a stored procedure is stored in a compiled format, it executes faster than if its constituent commands were executed individually.

Alternatively, a stored procedure may not be compiled prior to storage but may be automatically compiled the first time the procedure is invoked. As part of such a compilation, a query execution plan may be generated. The query execution plan describes the order in which tables are to be accessed and the indexes to be used. Further, the query execution plan is optimized for the stored procedure parameters and data in the database tables at the time the stored procedure is first executed.

A stored procedure may be invoked by its name. The caller can pass parameters to and receive results from the stored procedure. A user can create and name a stored procedure to execute specific database queries and perform other database tasks. For example, a user may create a stored procedure that returns the number of videos of a particular movie remaining in a video store for the video title that is specified at the time the stored procedure is called.

Stored procedures may also maintain the integrity of the database and prevent unauthorized users from modifying certain entries. For example, a user may be given the right to call a stored procedure that updates a table or set of tables but denied the right to update the tables directly.

Stored procedures may be created using a variety of mechanisms. The following format may be utilized to declare a stored procedure:

```
create proc {procedure name}
as
    {statement of block of statements}
```

For example the following stored procedure called myproc will return the number of Casablanca videos left in a video store as well as other movie titles, the rental price of those movie titles, and the location of those videos when Humphrey Bogart is an actor in the movie:

```
create proc myproc
as
begin
    select inv_videos
    from video
    where title_id = "Casablanca"
    select title_id, rental_price, location
    from video
    where actor = "Humphrey Bogart"
end
```

As described above, stored procedures can also be passed parameters. Parameters may be defined as part of the stored procedure creation statement. The syntax of a "create proc" command with parameters is:

```
create proc {proc name}
    ( @{param_name} {param_type},
      @{param_name} {param_type},
        {. . .}
    )
as
    {statement}
```

For example, the following stored procedure may be passed the @mytitle and @myactor parameters for use in the select query:

```
create proc myproc
    ( @mytitle char,
      @myactor char
    )
as
begin
    select inv_videos, title_id, rental_price, location
    from video
    where title_id = @mytitle
        or actor = @myactor
end
```

Once a stored procedure has been created, a user can invoke the stored procedure using the following syntax:

```
exec [database.owner.] {procname} {opt params}
```

In the above syntax, "database" and "owner" will default to the current database and the current dbo (database owner). For example, the following command may invoke the stored procedure "myproc" defined above:

```
exec myproc "Casablanca", "Humphrey Bogart"
```

In this example, the user would see the same results as if the following command were utilized:

```
select inv_videos, title_id, rental_price, location
    from video
    where title_id = "Casablanca"
        or actor = "Humphrey Bogart"
```

Additionally, the "exec" portion of an invocation of a stored procedure is not necessary if the stored procedure call is the first line in a batch.

Stored procedures can also have a "return" status. A "return" statement returns from the stored procedure with an optional status parameter. The return status is zero for success, or negative otherwise. Negative values between −1 and −99 are reserved. For example, the following stored procedure returns a negative value (−999) if no rows/records are in the result set and a 0 if rows/records are in the result set:

```
create myproc ( @mytitle char, @myactor char)
as
begin
    select title_id, rental_price, location
    from video
    where title_id = @mytitle
        or actor = @myactor
    if @@rowcount = 0
        return −999
    else
        return 0
end
```

The following commands illustrate the invocation of the above stored procedure with a return status:

```
declare @mystatus int
exec @mystatus = myproc "Casablanca", "Humphrey Bogart"
if @mystatus ! = 0
begin
    {do error processing}
end
else
begin
    (do normal processing}
end
```

In addition to providing parameters when invoking a stored procedure, default values for the parameters may be specified:

```
create proc myproc
    ( @myparam1         int = 0
      @myparam2         int = null,
      @myparam3         char(20) = "mydefault"
    )
as . . .
```

The above stored procedure provides a default value of 0 for @myparam1, a default value of null for @myparam2, and a default value of "mydefault" for @myparam3. To invoke the stored procedure, the user may specify the values for one or more parameters, if desired, or may allow one or more of the default values to be utilized:

```
exec myproc 1            /* params 2 & 3 default */
```

In the above invocation, only @myparam1 is specified in the execution line. Consequently, the specified default values for @myparam2 and @myparam3 are utilized (i.e., null and "mydefault").

Additionally, stored procedures can have output parameters as demonstrated below:

```
create proc myproc
        ( @myparam1              int
          @myoutparam            int output
        )
as
begin
        select @myoutparam = count(*)
        from titles
        where x > @myparam1
end
```

The output for the above stored procedure is the number of rows (i.e., the count) in the titles table where the value of x is greater than @myparam1.

To further optimize the processing time for working with and manipulating the data, some DBMS have distributed the data and provided for parallel processing of and to the data. Thus, the stored procedures utilized to manipulate and work with the data are executed in parallel on the parallelized/distributed data. Some stored procedures are associated directly with certain types of data on a particular data server (storage location for the data). However, these stored procedures may attempt to manipulate and retrieve information from data not located on the data server where the stored procedure is located. Accordingly, it is difficult to start up parallel execution of a stored procedure that resides on any one data server.

Further, since the stored procedures may be written independently from (and without knowledge of the parallelized data system, it is difficult to provide results to the stored procedure in a clean manner. In other words, when a stored procedure operates or requests data (i.e., using SQL commands), the interface within which the results are returned is difficult to establish and maintain without exposing the parallelism to the stored procedure. What is needed is a system and method for efficiently and cleanly executing SQL statements from stored procedures on a parallelized DBMS.

SUMMARY OF THE INVENTION

To address the requirements described above, the present invention discloses a method, apparatus, and an article of manufacture for parallel execution of SQL operations from stored procedures.

The method comprises providing the stored procedure with a C++ class (hereinafter referred to as "dispatcher") that can take an SQL query and start parallel execution of the query. The query is optimized and parallelized. The dispatcher executes the query, sets up the communication links between the various operators in the query, and ensures that all the results are sent back to the data-server that originated the query request. Further, the dispatcher merges the results of the parallel execution and produces a single stream of tuples that is fed to the calling stored procedure. To provide the single stream to the calling stored procedure, one or more embodiments of the invention utilize a class that provides the stored procedure with a simple and easy-to-use interface to access the results of the nested SQL execution. In one or more embodiments of the invention, a C++ class such as the TOR InputStream class available from NCR Corporation, the assignee of the present invention is utilized.

BRIEF DESCRIPTION OF THE DRAWINGS

Referring now to the drawings in which like reference numbers represent corresponding parts throughout:

FIG. 5 is a diagram showing one or more embodiments of the user front end of the exemplary hardware environment depicted in FIG. 1;

DETAILED DESCRIPTION

In the following description, reference is made to the accompanying drawings which form a part hereof, and which is shown, by way of illustration, several embodiments of the present invention. It is understood that other embodiments may be utilized and structural changes may be made without departing from the scope of the present invention.
Parallel Execution of SQL Outside of Stored Procedures In one or more embodiments of the invention, a relational database or an object relational database (e.g., a Teradata® Object Relational (TOR) database) may be utilized. In an object relational database, tables of information may contain both coded (alphanumeric) data and multimedia object data. These tables are referred to as object-relational tables. Coded data is contained in table columns defined with traditional relational database data types, such as integer, character, floating point, and date. Objects are contained in table columns defined with Abstract Data Types (ADT) such as text, images, audio, and video. The objects persist in the table such that they may be retrieved and used instead of creating a new instance of an object. Further SQL commands may be utilized to interact with and manipulate the records/information in the tables. Alternatively, data in an object relational database may be wrapped or encapsulated by an object that provides an interface to edit, delete, manipulate, etc. the data.

Figure 1:
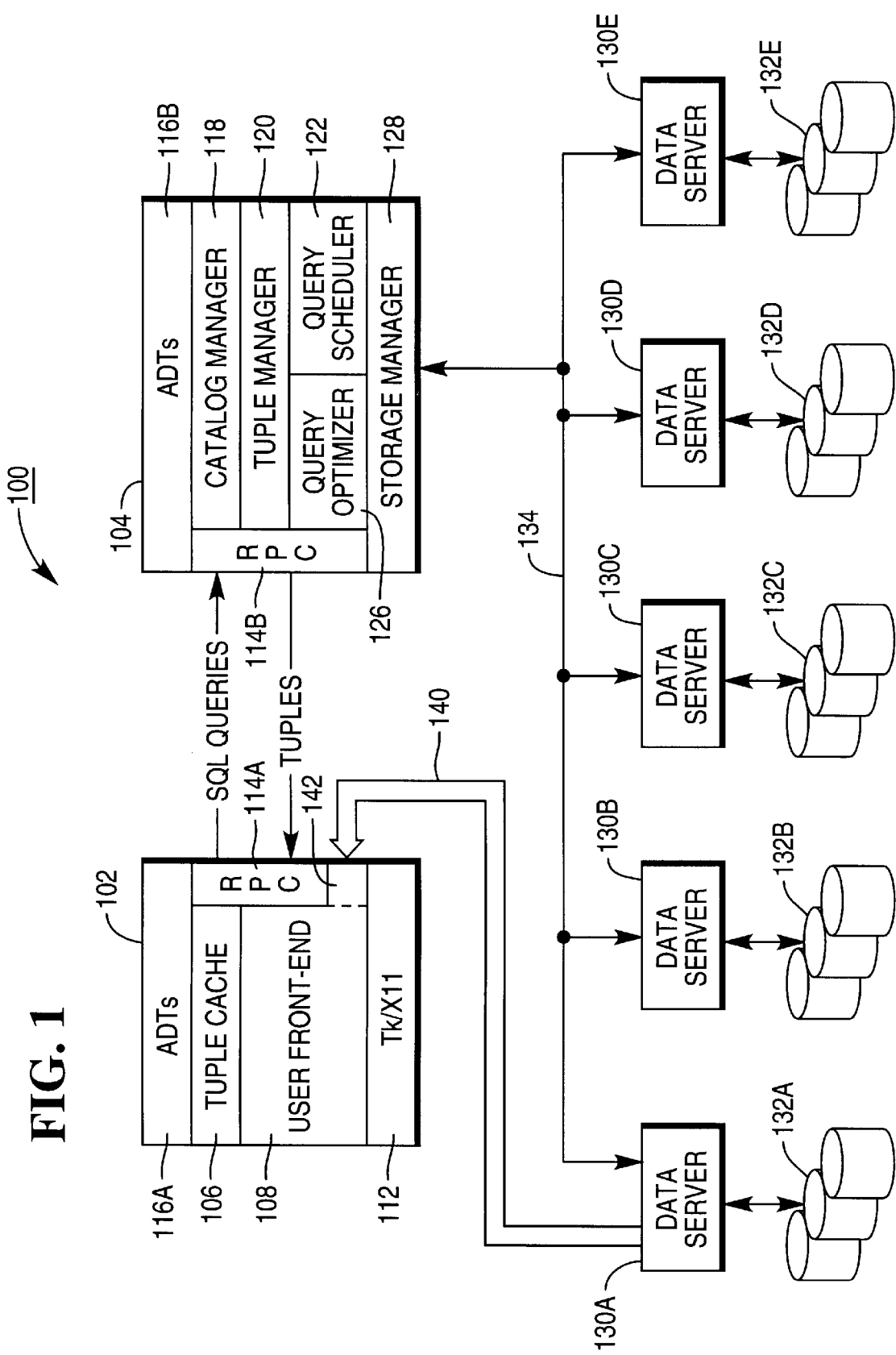
FIG. 1 is a block diagram showing an exemplary environment for practicing one or more embodiments of the present invention.

FIG. 1 is a diagram showing an exemplary environment in which one or more embodiments of the invention provide for parallel execution of SQL commands. However, the underlying details of FIG. 1 are modified to provide for parallel execution of SQL when the SQL is from a stored procedure. The database system 100 uses a client-server architecture comprising a query scheduler 122 implemented in a query coordinator (QC) 104 and one or more data servers (DS) 130A–130E (hereinafter referred to as data server(s) 130) storing data in one or more data storage devices 132A–132E (hereinafter referred to as data storage device(s) 132. The data servers 130 also perform portions of the execution plan in execution threads as determined by the query coordinator 104 to execute the query. The query coordinator 104 and data servers 130 may be implemented in separate machines, or may be implemented as separate or related processes in a single machine. The QC 104 and the DS 130 communicate via a communication infrastructure 134 which can automatically select the most efficient mechanism for the transport of data between the QC 104 and any one of the DS 130 elements. When a message is between processes or entities that do not share a common memory system, a transport protocol such as transmission control protocol (TCP) or message passing interface (MPI) can be utilized to transfer the information. However, when the communication is between processors on a symmetric multiprocessing system (SMP), memory may be used as the transport vehicle.

Client processes 102, which can include applications or graphical user interfaces (GUIs), can connect to the QC 104 for submitting a query. After parsing and optimization, the QC 104 generates an execution plan (referred to as an ASCII plan) for the query, performs further processing on the ASCII plan (discussed below), and transmits portions of that plan to the appropriate data servers 130A–130E for execution. Hence, the QC 104 controls the parallel execution of the query on the DS 130 processes. Query results including result sets are collected by the QC 104 for delivery back to the client process 102.

The QC 104 and DS 130 processes can be implemented as multithreaded processes on top of a storage manager 128. The storage manager 128 provides storage volumes, files of untyped objects, B+ trees and R* trees. Objects can be arbitrarily large, up to the size of the storage volume. In one embodiment, allocation of storage space within a storage volume is performed in terms of fixed size extents. The associated I/O processes and the main storage manager 128 server process share the storage manager 128 buffer pool, which is kept in shared memory.

The database system 100 uses many basic parallelism mechanisms. Tables may be fully partitioned across all disks in the system 100 using round robin, hash, or spatial declustering. When a scan or selection query is executed, a separate thread is started for each fragment of each table.

In one embodiment, the database system 100 also uses a push model of parallelism to implement partitioned execution in which tuples are pushed from leaves of the operator tree upward. Every database system 100 operator (e.g. join, sort, select, . . . ) takes its input from an input stream and places its result tuples on an output stream. The streams themselves are C++ objects and can be specialized in the form of "file streams" and "network streams". File streams are used to read/write tuples from/to disk. Network streams are used to move data between operators either through shared-memory or across a communications network via a transport protocol (e.g. TCP/IP or MPI). In addition to providing transparent communication between operators on the same or different processors, network streams also provide a flow-control mechanism that is used to regulate the execution rates of the different operators in the pipeline. Network streams can be further specialized into split streams, which are used to demultiplex an output stream into multiple output streams based on a function being applied to each tuple. Split streams are one of the key mechanisms used to parallelize queries. Since all types of streams are derived from a base stream class, their interfaces are identical and the implementation of each operator can be totally isolated from the type of stream it reads or writes. At runtime, the scheduler thread (running in the QC process 104 through Query Scheduler 122), which is used to control the parallel execution of the query, instantiates the correct type of stream objects to connect the operators. Alternatively, when a stored procedure is executing, the stored procedure may instantiate the correct type of stream object in order to retrieve the results from query execution (see description below).

For the most part, the database system uses standard algorithms for each of the basic relational operators. Indexed selections are provided for both non-spatial and spatial selections. For join operations, the query optimizer 126 can choose from nested loops, indexed nested loops, and dynamic memory hybrid hash joins. The database system's query optimizer 126 considers replicating small outer tables when an index exists on the join column of the inner table.

The database system uses a two-phase approach for the parallel execution of aggregate operations. For example, consider a query involving an average operator with a group by clause. During the first phase each participating thread processes its fragment of the input table producing a running sum and count for each group. During the second phase a single processor (typically) combines the results from the first phase to produce an average value for each group.

Since standard SQL has a well defined set of aggregate operators, for each operator the functions that must be performed during the first and second phases are known when the system is being built and, hence, can be hard coded into the system. However, in the case of an object-relational system that supports type extensibility, the set of aggregate operators is not known in advance as each new type added to the system may introduce new operators. Hence, a mechanism is provided for specifying the first and second phase function with the definition of each aggregate.

The query coordinator 104 also comprises a tuple manager 120, a catalog manager 118, a query optimizer 126, a query scheduler 122, and a storage manager 128. The tuple manager 120 receives the tuples from the data servers 130, formats and processes the tuples, and passes them along to the client program 102. The catalog manager 118 manages metadata regarding the tables and types in the database. The query optimizer generates an execution plan (referred to as an ASCII plan) for queries received from the client process 102.

Figure 2:
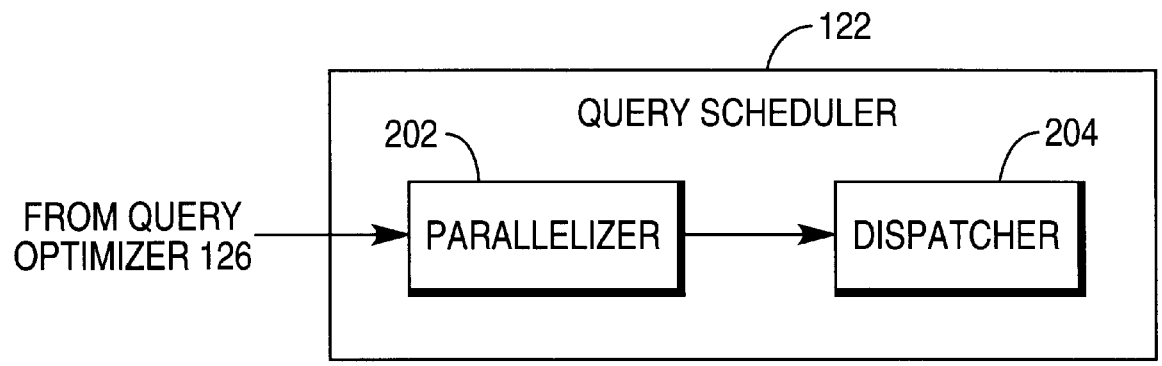
FIG. 2 is a diagram illustrating the details of the query scheduler in accordance with one or more embodiments of the invention.

Thus, in accordance with one or more embodiments of the invention, when a query comes into the system, the query is sent to query optimizer 126 where the query is parsed/typechecked, optimized, and generated into an ASCII plan (a sequential execution plan). The ASCII plan is then forwarded to query scheduler 122. As illustrated in FIG. 2 query scheduler 122 contains a parallelizer 202 and a dispatcher 204. When the ASCII plan is forwarded from query optimizer 126 to query scheduler 122, parallelizer 202 receives the ASCII plan and generates a parallel execution plan. The parallel execution plan is then sent to dispatcher 204. Dispatcher 204 performs the execution of the parallel plan.

Figure 3:
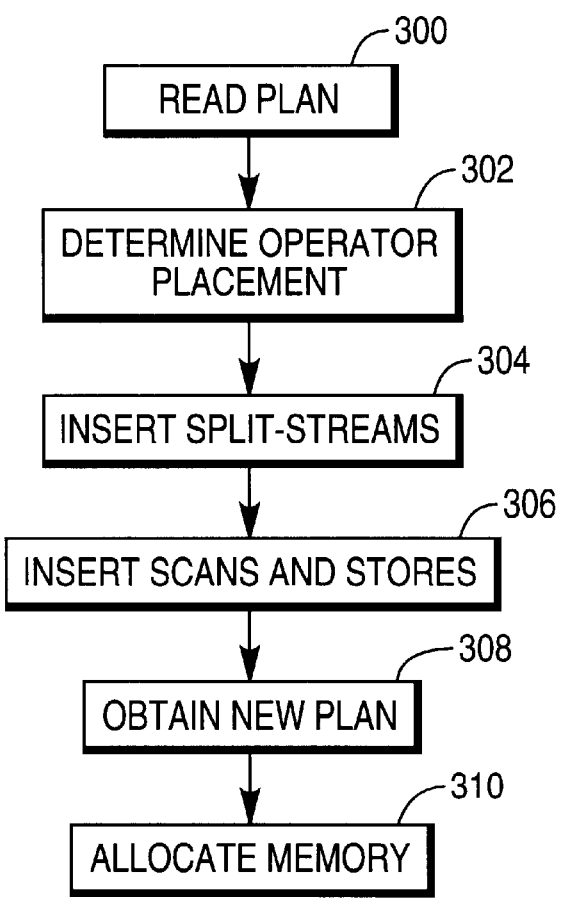
FIG. 3 is a flow chart illustrating the operation of a parallelizer in accordance with one or more embodiments of the invention.

FIG. 3 is a flow chart illustrating the operation of parallelizer 202. At step 300, the ASCII plan is read/received from query optimizer 126. Once read, a new plan is developed. At step 302, parallelizer 202 determines the placement of the various operations on the various nodes (i.e., appropriate data server 130) in the system. At step 304, split-streams are inserted into the new plan at the appropriate locations. Split-streams provide the ability to perform the necessary declustering and partitioning of data servers 130 and data storage devices 132. At step 306, any scans and stores that are necessary are inserted into the plan.

At step 308, the completed new plan is obtained. In one or more embodiments of the invention, the ASCII plan is broken down and an "exec_plan_t" is obtained. An exec_plan_t is essentially a break-up of the ASCII plan into a list of segments. In accordance with steps 304 and 306, the split-streams and scans and stores are inserted into the exec_plan_t. The new plan can be executed by sequentially executing each segment one after another. Each segment is a list of operators that can be executed concurrently in a pipelined fashion. Thus, since each segment can be executed concurrently by different data servers 130, the parallelism of database system 100 is established. At step 310, memory needed for the individual operators of each segment are allocated. In one or more embodiments of the invention, the MemoryManager is utilized for memory allocation. However, it should be noted that any memory management technique/program may be utilized in accordance with embodiments of the invention.

Figure 4:
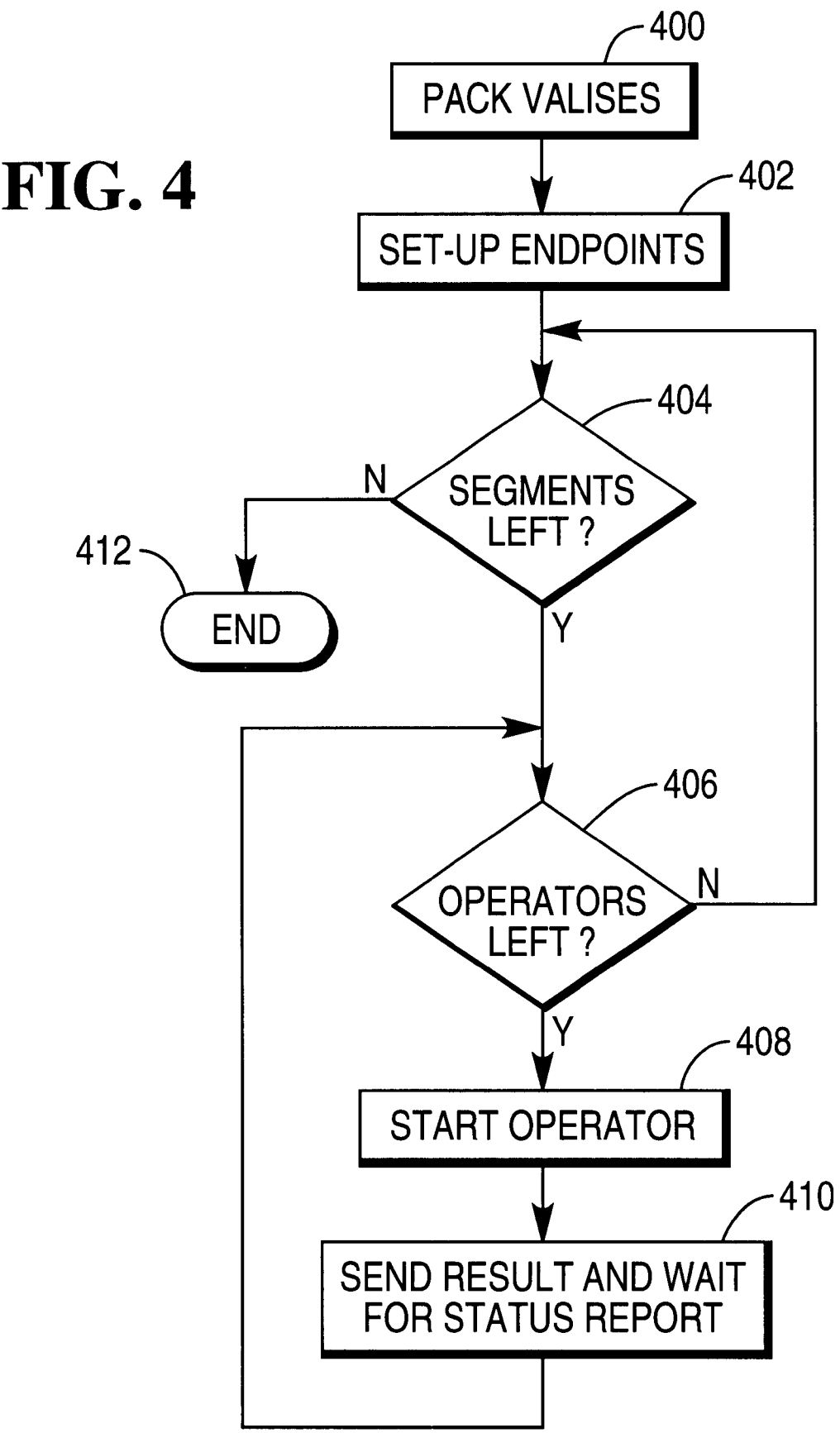
FIG. 4 is a flow chart illustrating the operation of a dispatcher in accordance with one or more embodiments of the invention.

FIG. 4 is a flow chart illustrating the operation of dispatcher 204. Dispatcher 204 is responsible for dispatching and executing an exec_plan_t by starting segments on appropriate data servers 130. At step 400, dispatcher 204 packs operator information and arguments into valises. A valise is a flat representation of scheduler data structures that can be transmitted over a network from one node to another node. Nodes may be viewed as units, systems, or any other structure in database system 100. For example, QC 104, client program 102, data servers 130, and data storage devices 132 are all nodes.

At step 402, dispatcher 204 sets up various endpoints so that each operator in the pipeline knows where to send its results. At step 404, a determination is made regarding whether any more segments are left that have not been executed. If not, the process is complete at step 412. If segments are left, a determination is made as to whether the segment contains any operators that have not been executed. If there are no operators left in the current segment, processing continues at step 404.

However, if operators are left, the operator is started at step 408. At step 410, the results for the operator are transmitted to the endpoint set-up in step 402 and dispatcher 204 waits for the status reports from the operator. Processing then continues at step 406.

In one or more embodiments of the invention, the plan (e.g., exec_plan_t) is set up in such a manner, that the top-most operator in the query writes its output to a query tree. A query tree is a hierarchical structure that provides the ability to order the results/output from a query. After the query outputs the results to the query tree, the query tree stores the results in a temporary file on a disk.

Thus, in accordance with one or more embodiments of the invention, dispatcher 204 starts up all operators in a segment, transmits the results, and waits for the status reports from each operator started. Additionally, after all of the operators in a segment have completed execution, dispatcher 204 repeats the process for all of the other segments in the exec_plan_t.

Referring back to FIG. 1, client program 102 comprises a front end 108, which provides a graphical user interface that supports querying, browsing, and updating of database objects through either its graphical or textual user interfaces. In either case, the front end transforms a query into an extended SQL syntax and transmits it to the data server 130 for execution. After executing the query, the query coordinator 104 transmits the results back to the client program 102 in the form of a set of tuples that can be iterated over using a cursor mechanism. In one embodiment, all communications between the front end 108 and the processes implemented in the query coordinator 104 are in the form of remote procedure calls 114A and 114B implemented over a Transmission Control Protocol/Internet Protocol (TCP/IP). The client process 102 also comprises a tuple cache 106 for retaining tuples received from the query coordinator 104. Abstract Data Types (ADTs) 116A and 116B can be stored and/or processed in either the query coordinator 104 or the client process 102.

The client front end 108 permits the display of objects with spatial attributes on a 2-D map. For objects with multiple spatial attributes, one of the spatial attributes can be used to specify the position of the object on the screen. The spatial ADTs currently supported include points, closed polygons, polylines, and raster images.

The client front end 108 can also present a layered display of overlapping spatial attributes from different queries or tables. For example, one can display city objects that satisfy a certain predicate (e.g. population>300K) in one layer on top of a second layer of country objects.

The client front end 108 also allows the user to query through a graphical interface; implicitly issuing spatial queries by zooming, clicking, or sketching a rubber-banded box on the 2-D map. The graphical capabilities of the client can be implemented using toolkits such as Tk/X11. Further, the user can query by explicitly composing ad-hoc queries in the database system's 100 extended SQL syntax.

The user can use the client front end 108 to browse the objects from a table. In this mode, attributes are displayed as ASCII strings. The front end 108 can also be used to update database objects. Object(s) to be updated can be selected either by pointing-and-clicking on the 2-D map or by selecting via the textual browser.

Finally, the client front end 108 can also be used to perform general catalog operations including browsing, creating new databases, defining new tables, creating indices on attributes, and bulk loading data into tables from external files.

The database system 100 also advantageously uses a second communication path 140 to transmit selected data such as master object data and large objects to the client 102, as described further below. The direct data transfer module 142 in the client 102 receives this data.

FIG. 5 is a diagram showing one embodiment of the user front end of the exemplary environment depicted in FIG. 1. The client front end 108 comprises a map view 502, layer manager 504, browser 506 and a query composer 508. The map view 502 is responsible for displaying and manipulating objects contained in one or more layers. The current position of the cursor is continuously displayed in a sub-window in units of the map projection system. Users can point and click on displayed objects to view their non-spatial attributes. The layer manager 504 is responsible for adding, deleting, hiding, and reordering layers displayed by the map view 502. Each layer corresponds to a table of objects produced by executing some query. The extent browser 506 allows a user to view any database table and adjust the way it should be displayed by the map view 502. The selected table becomes a new layer with its spatial attributes displayable via the map view 502.

The query composer 508 allows a user to compose a SQL query using a simple text editor. The RPC 114 is the interface to the query coordinator 104. It ships SQL queries to the query coordinator 104 for execution and retrieves result tuples into the cache 510. The cache 510 comprises a master data cache 510A, a metadata cache 510B and an object cache 510C. The object cache 510C caches the result of a query in formats understood by the map view 502. The metadata cache 510B stores the catalog information of the currently open database. The master data cache 510A stores retrieved master data as described further below. In one embodiment, the object cache 510C also caches the objects downloaded from the data servers 130. FIG. 5 also shows the second communication path 140 from the data server 130 to the user front end 108 via the direct data transfer module 142.

Array-based abstract data types (ADTs) can be used as basis for a number of useful data types, including BLOBs, CLOBs, video, audio, text, image, maps and other large objects. Array-based ADT use an external out-of-line storage for very large objects.

Figure 6A:
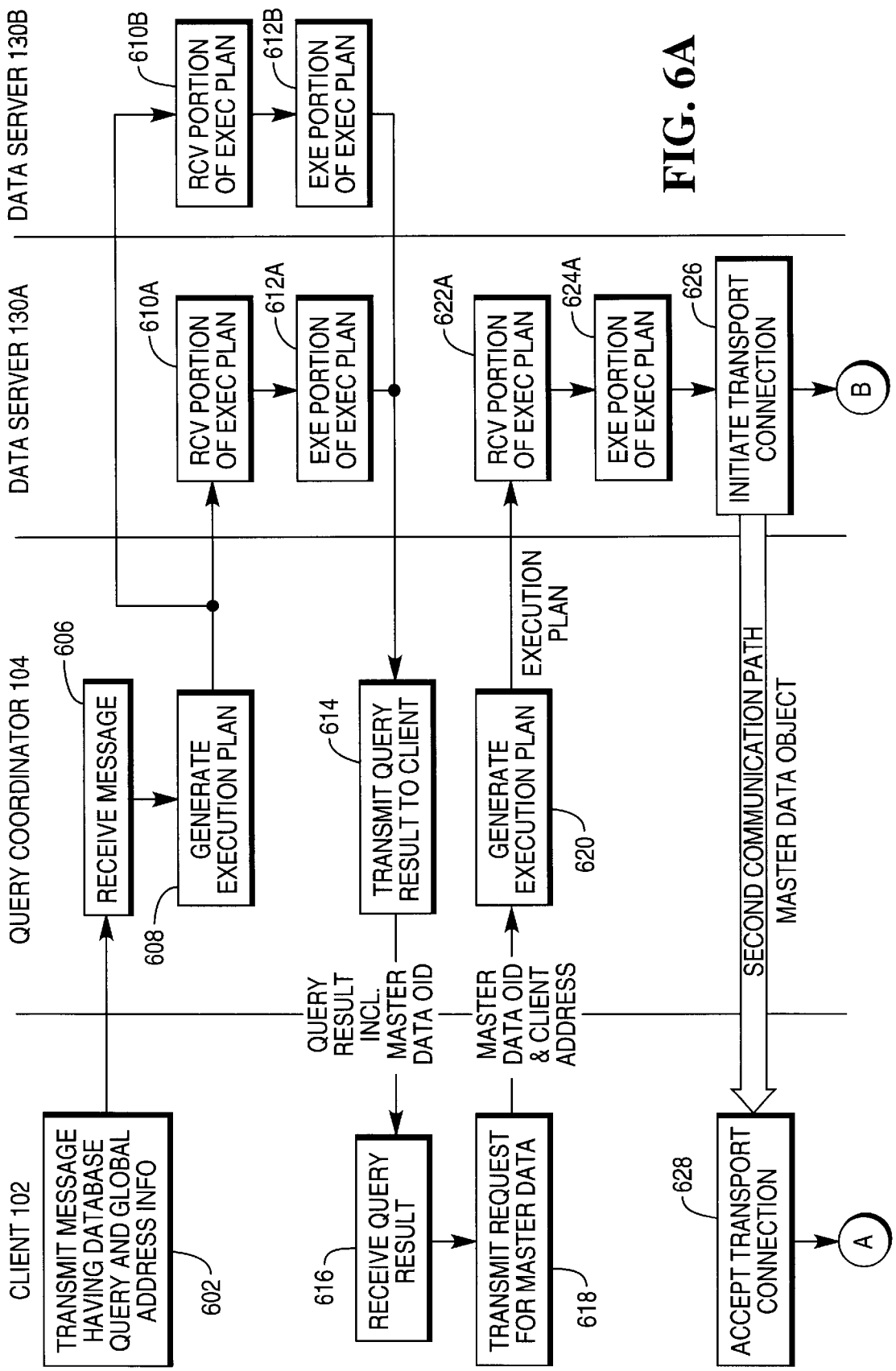
FIGS. 6A and 6B are diagrams illustrating one or more embodiments of the invention.

FIG. 6A is a diagram illustrating one or more embodiments of the present invention. The client 102 transmits 602 a message to the query coordinator 104. The message includes a database query, and may optionally include client address information. The query coordinator 104 receives 606 the message and using the information in the message, generates 608 an execution plan (i.e., query optimizer 126 generates the ASCII plan). The execution plan is then parsed into one or more portions, each of which represents an execution plan thread (an exec_plan_t) (i.e., the query scheduler 122 using parallelizer 202 and dispatcher 204 parallelize and provide for execution of the plan). These are transmitted to the data servers 130, which receive 610 and execute 612 their respective portions of the execution plan. Results from the data servers 130 are transmitted to the query coordinator 104, which compiles the results into a query result having a result set. This information is transmitted 614 back to the client 102. In one embodiment, this query result information includes an object identification (OID) for the master data (MOID). Other query result information may also be included, such as the dimensions and size of the master data.

It is important to note that master data associated with the MOID (that which is responsive to the database query) can be quite large. Hence, while the master data could be delivered via the query coordinator 104 to the client 102, direct transfer from the data server in such cases best accomplishes such delivery.

Returning to FIG. 6A, the client transmits 618 a request for the master data. Included in this request is the OID for the master data (the MOID). In one embodiment, this client address information is globally unique and includes the client address and port.

The query coordinator 104 accepts this message, and from the information in the message, generates 620 another execution plan. This execution plan (which includes the client global address) is simpler than the one generated previously (to respond to the database query), but nonetheless, still requires the generation of a fetch object operator. Alternatively, the MOID can be transmitted from the client 102 to the data server 130 without intervention of the query coordinator 104, or the query coordinator 104 can simply accept the request for the master data and pass it along to the data server 130.

The data server 130 receives 622 and executes 624 the applicable portion of the execution plan, and initiates 626 a transport connection with the client 102 via the second communication path 140 using the client IP address and port number. The client 102 accepts 628 the transport connection.

Figure 6B:
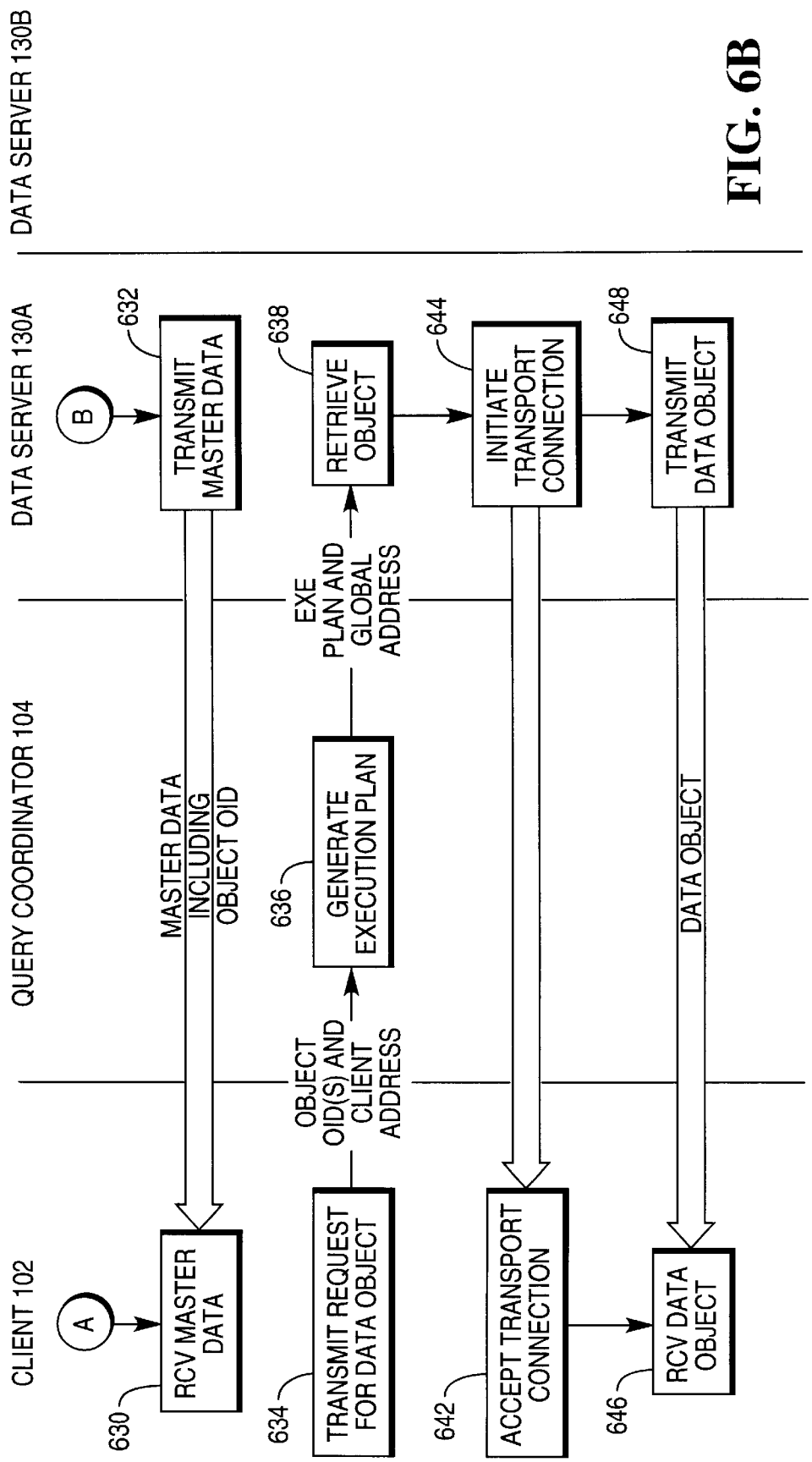

FIG. 6B shows the client data server transmitting 632 the master data via the transport connection on the second communication path 140 to the client 102. In one embodiment, the master data includes information such as the dimensions and size of the related master object, and an object identification (AOID) for the data objects associated with the master data object.

The user may then request one or more data objects in the array that cumulatively represents the master data object. This data is represented in one of the data objects, having related object identifications (AOIDs) that were transmitted with the master data object. That request can be submitted by transmitting a message including the AOIDs of the data objects of interest and the address of the client 102 to the query coordinator 104. The query coordinator 104 again generates 636 a simple execution plan designed to retrieve the data objects of interest from the data server 130. The execution plan and the address of the client 102 are sent to the data server 130, which retrieves 638 the objects from the storage manager. In one embodiment, the data server uses the client address to initiate 644 a transport connection with the client 102. The client 102 accepts 642 the transport connection. In another embodiment of the present invention, the transport connection originally established with the client 102 (in block 626) is maintained for the duration of the session with the client 102. In this embodiment, there is no need to re-establish the transport connection between the data server 130 and the client 102. In any case, the data server 130 transmits 648 the requested data object, and the client 102 receives it through the second communication path 140.

Using the foregoing technique, all of the AOIDs for the master data are collected across all of the tuples in the current query result set, and are fetched all in one batch. Similarly, the array data objects can be fetched in batch mode. The same approach can be applied to the real objects themselves.

Stored Procedures

One or more embodiments of the invention allow users to specify and attach arbitrary stored procedures to the existing datatypes in data servers 130. As described above, stored procedures are typically utilized or invoked within the RDBMS (Relational Database Management System).

Stored procedures can be supplied from many sources. Database users can write stored procedures. Stored procedures that perform a commonly used set of commands can also be supplied by the DBMS owner such as NCR Corporation, the assignee of the present invention. Alternatively, stored procedures can be supplied by third-party vendors.

Nested Execution of SQL from Stored Procedures

Parallel execution of stored procedures relies on the fact that all stored procedures are executed on the various data servers 130 in the parallel system 100. In other words, the stored procedures are associated with and executed on particular data servers 130. As described above, it is desirable that the parallelization and execution of the SQL from a stored procedure remain transparent to the stored procedure such that the user defining the stored procedure does not know, need to know, or maintain knowledge of the underlying parallelization of the DBMS.

As described above, since stored procedures are executed on individual data servers 130, it is problematic to obtain and execute queries from within the stored procedure on one data server 130 when the data that is the subject of the SQL of the stored procedure may reside on different data servers 130. Such problems are further exacerbated since the execution of the query needs to remain transparent to the stored procedure.

Further, using the embodiments described above, when executing SQL commands/queries, the system catalogs, as described above, are needed. System catalogs are only available to query coordinator 104 through catalog manager 118 and are not accessible from data servers 130. Thus, in the above embodiments, execution of an "inner" nested SQL query from a stored procedure at a data server 130 can be a problem.

To execute nested SQL queries from stored procedures at a data server 130, one or more embodiments of the invention conduct preprocessing on the SQL query. In such embodiments, the preprocessing breaks up the execution of the SQL query into two parts: (1) a part that requires access to system catalogs, and (2) a part that does not require access to system catalogs. Subsequently, it is ensured that the first part is executed at QC 104 before the query starts execution. The second part, which does not require access to the system catalogs, can then be safely executed at the local nodes (i.e., data servers 130).

As described above, certain operations may only be performed at certain nodes (e.g., catalog accesses may only be performed by QC 104). To enable the paralellization of the query execution, one or more embodiments of the invention parallelize and divide the operations needed to execute the query and distribute the operations to either QC 104 or data server 130.

Figure 7:
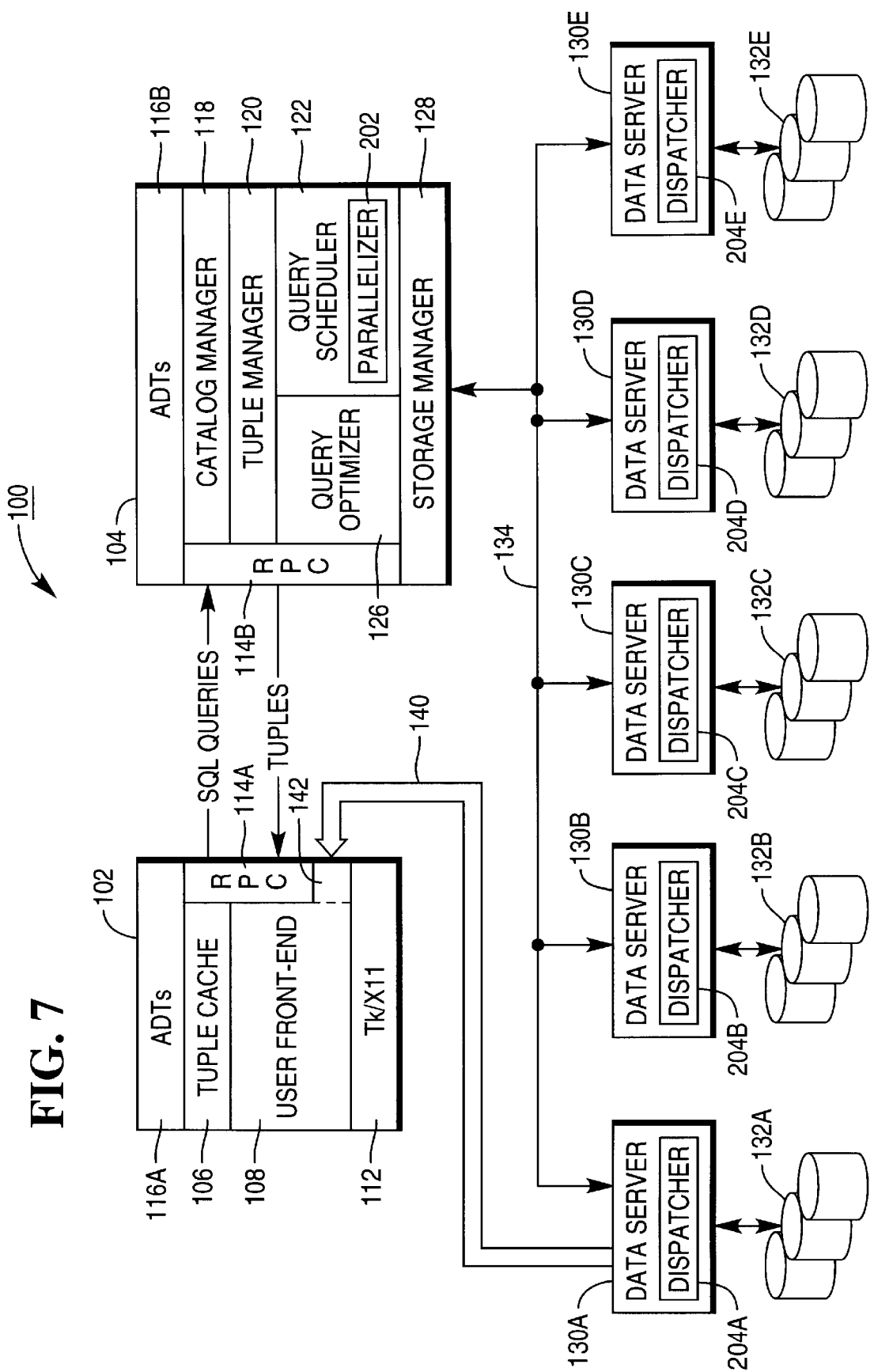
FIG. 7 is a block diagram showing an exemplary environment for practicing one or more embodiments of the present invention.

Parallelizer 202 heavily relies on catalogs. Consequently, the parallelizer 202's functionality cannot be moved outside of QC 104 (e.g., to data servers 130). However, dispatcher 204 does not need the catalogs. Thus, in accordance with one or more embodiments of the invention, dispatcher 204 is moved to data server 130. FIG. 7 illustrates the data system 100 as illustrated in FIG. 1 with dispatchers 204A–204E located on data servers 130A–130C. FIG. 7 also illustrates that parallelizer 202 still remains in query scheduler 122 of QC 104. To move dispatcher 204 to data server 130, one or more embodiments of the invention provide/permit a stored procedure to utilize a dispatcher class for the execution of queries. Thus, an instance of a dispatcher class (that may be programmed in any programming language including object oriented programming languages such as C++) may be instantiated at each data server 130.

To separate the non-system catalog operations from the system-catalog operations (i.e., the move of dispatchers 204 to data servers 130), one or more embodiments of the invention implement a two phase plan. In the first phase, a query is "prepared" for execution. Phase one is executed at QC 104. The "preparation" of the query includes all actions performed by QC 104 as described above except for actions performed by dispatcher 204. Thus, phase one includes query optimization and the generation of an ASCII plan by query optimizer 126. Additionally, phase one includes the parallelization of the query by parallelizer 202 (i.e., all of the steps of FIG. 3) resulting in the generation of the exec_plan_t as described above.

After phase one is complete, no more catalog look-ups are needed for execution of the query. However, some steps described above that are performed by dispatcher 204 (e.g., steps 400 and 402) do not utilize the system catalogs. Accordingly, QC 104 may perform either or both steps 400 and 402 of FIG. 4. Thus, in accordance with one or more embodiments of the invention, the exec_plan_t can be flattened and packed in a valise. Thereafter, the exec_plan_t can either be stored in the catalogs or shipped to data servers 130. In one or more embodiments of the invention, the plan can be shipped to a data server 130 as a part of a predicate (of an SQL query). Further, prior to shipping the plan to data server 130, the endpoints may be set up by QC 104.

As illustrated in FIG. 7, each data server 130A–130E can have an instance of a dispatcher object 204A–204E. Each instance has the capability to receive a flattened execution plan (e.g., from QC 104) and execute the plan. In one or more embodiments of the invention, data server 130 and QC 104 are running the same executable code (i.e., data server 130 and QC 104 are each performing actions needed to execute the same code of the stored procedure). Consequently, all of the dispatcher 204 code is available to data server 130.

Figure 8:
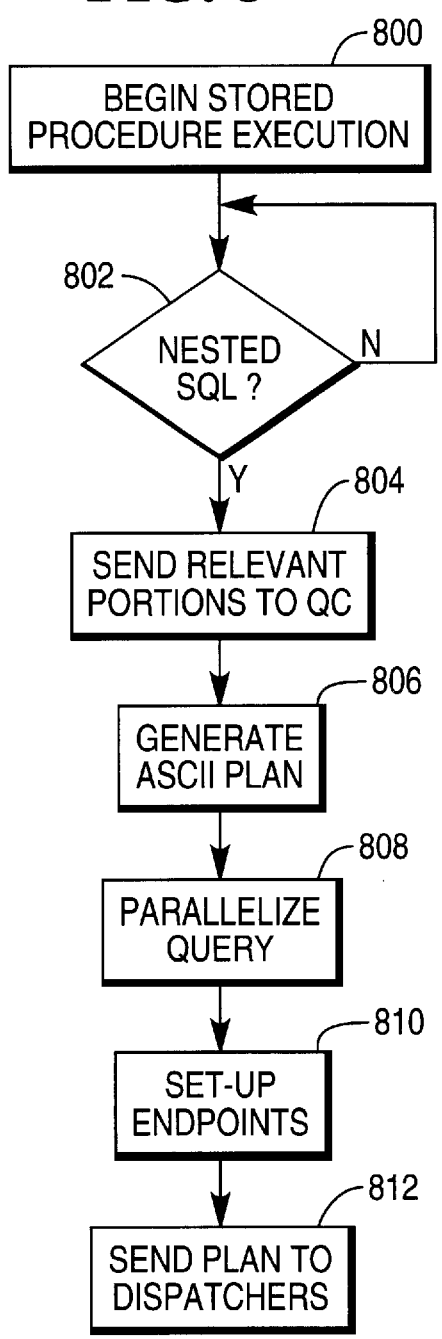
FIG. 8 is a flow chart illustrating the operation of various nodes in accordance with one or more embodiments of the invention.

As described above, the stored procedure is executed on the various data servers 130A–130E. FIG. 8 is a flow chart illustrating the operation of various nodes in accordance with one or more embodiments of the invention. A step 800, execution of the stored procedure begins. At step 802, a determination is made as to whether a nested SQL statement is encountered in the stored procedure. If not, execution of the stored procedure continues. If an SQL query is encountered, the relevant portions of the query (e.g., the portions that cannot be executed on the data server 130) are forwarded to QC 104 at step 804. At step 806, QC 104 generates the ASCII plan (e.g., using query optimizer 126). At step 808, parallelizer 202 parallelizes the plan and generates an exec_plan_t. At step 810, the various endpoints are set up. At step 812, the exec_plan_t is sent to the appropriate dispatcher 204A–204E for execution. Thus, during execution of the stored procedure, the flattened plan (e.g., the exec_plan_t) can be sent to the dispatcher 204 for execution.

Nested Query Result Retrieval

After execution of the query by the various dispatchers 204, the results of the query must be retrieved. Normally, the top-most operator of a query outputs the results to a query tree where the results are stored in temporary memory (e.g., on a temporary file in a disk or in cache). In one or more embodiments of the invention, the topmost operator sends the results back to the stored procedure instead of the query tree.

To enable transmission of the results to the stored procedure, one or more embodiments of the invention utilize streams of information as described above. To receive a stream of information, the stored procedure (or the QC 104 as described above) identifies/allocates an endpoint (i.e., step 810 of FIG. 8) where the stored procedure can receive input. The stored procedure then sets up an input stream that obtains input from the specified endpoint. Once the endpoint is designated, the stored procedure instructs the dispatcher to dispatch the SQL query in such a way that the topmost operator of the query sends all of its output to the specified endpoint.

In one or more embodiments of the invention, the following stored procedure code illustrates the use of input streams and endpoints to receive query results:

```
Endpoint *ep = create_ep ();
exec_plan_t *plan = my_plan ();
baseAdt *parameters = current_literal_values ();
dispatcher->execute (plan, ep, parameters);
```

-continued

```
InStream *stream = create_stream (ep);
while (tuple = stream.getNextTuple ())
    do_stuff (tuple);
```

The example code above provides for the execution of various operations. The first line ("Endpoint *ep=create_ep ( );") provides for the creation of an endpoint called "ep". The line executes the create_ep( ) procedure and returns the result of the value. The result may be referenced by using the pointer to the result called ep. In accordance with embodiments of the invention, the endpoint creation and assignment may be performed at the QC node 104 or may be performed at the data server node 130.

The second line ("exec_plan_t *plan=my_plan ( );") provides for obtaining an exec_plan_t (or a pointer to an exec_plan_t) called "plan" by calling a function called "my_plan." In accordance with embodiments of the invention, the exec_plan_t is created by parallelizer 202 at the QC node 104.

The third line ("baseAdt *parameters=current_literal_values ( ) ;") provides for obtaining the current values (or pointers to the current values) of abstract data types (ADT) and placing (pointing to) them in a "parameters" variable.

The fourth line ("dispatcher->execute (plan, ep, parameters) ;") provides for execution of the query by the dispatcher—the dispatcher 204 executes an operation from the specified plan using the specified parameters and outputs the result to the specified endpoint ep. In accordance with embodiments of the invention, dispatcher 204's functions are performed at the data server node 130.

The fifth line ("Instream *stream=create_stream (ep);") creates an input stream (using the create_stream method and the pointer ep as a parameter) that will obtain/attach to the stream of information at the specified endpoint ep. The input stream may be referenced by using the pointer to the input stream called "stream".

The sixth and seventh lines ("while (tuple=stream.getNextTuple ( ))do_stuff (tuple);") provide for a loop that continues to execute while tuples are in the input stream. Thus, the lines enable a user to retrieve the next tuple (from the input stream) and perform an operation on the tuple. In this specific example, the do_stuff operation is performed on the retrieved tuple. Thus, the stored procedure can retrieve the results from the executed operation (the operation executed by the dispatcher in line 4) by examining the tuple on the input stream. Further, in accordance with one or more embodiments of the invention, the input stream class (i.e., "InStream") may be provided to the stored procedure so that the stored procedure may interface with the input stream relatively simply.

Figure 9:
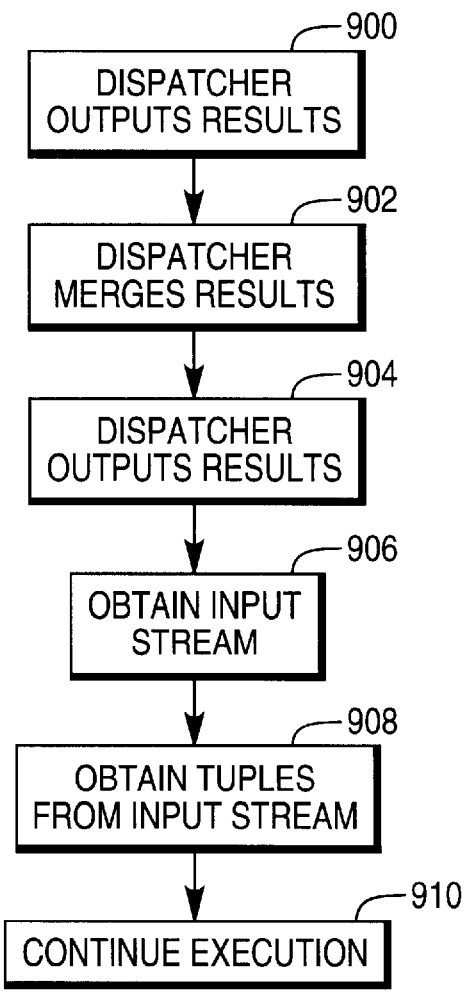
FIG. 9 is a flow chart illustrating the retrieval of query results in accordance with one or more embodiments of the invention.

FIG. 9 is a flow chart illustrating the retrieval of query results in accordance with one or more embodiments of the invention. At step 900, the various dispatcher instances 204A–204E output their results to a single dispatcher instance 204. At step 902, the single dispatcher instance 204 (at a particular data server 130) merges the results from the parallel execution of the various data servers 130 to produce a stream of tuples. At step 904 the merged stream of tuples are output to the specified endpoint. At step 906, the stored procedure obtains an input stream from the endpoint. At step 908, each tuple may be obtained from the input stream by the stored procedure. Execution of the stored procedure continues at step 910 (e.g., the stored procedure can perform operations on the tuple or continue executing other SQL or non-SQL commands).

By implementing the invention as described above, the stored procedure does not need to know about the parallelization and execution of the query performed by QC 104 and data server 130. Instead, the stored procedure merely uses a dispatcher object to take and execute the query, and retrieves the results using a simple interface to an input stream.

Thus, in accordance with one or more embodiments of the invention, the query is parallelized, the dispatcher executes the query, sets up the communication links between the various operators in the query, and ensures that all of the results are sent back to the data server 130 that originated the query request. At the data server 130 that originated the request, the dispatcher merges the results of the parallel execution and produces a single stream of tuples that is fed to the calling stored procedure using an input stream.

Hardware and Software Embodiments

Referring back to FIGS. 1 and 7, an exemplary hardware and software environment is shown that could be used to implement one or more embodiments of the invention. Each node (i.e., client program 102, QC 104, data server 130, and data storage device 132) may each comprise a computer that may have a processor and a memory, such as random access memory (RAM). Additionally, each node may be operatively coupled to a display, which presents images such as windows to the user on a graphical user interface (e.g., user front-end 108). Each node may be coupled to other devices, such as a keyboard, a mouse device, a printer, etc. Of course, those skilled in the art will recognize that any combination of the above components, or any number of different components, peripherals, and other devices, may be used with embodiments of the invention.

Generally, each node may operate under the control of an operating system stored in memory. In one or more embodiments, the client program 102 (and the other nodes) interfaces with the user to accept inputs and commands and to present results through a graphical user interface (GUI) (e.g., user front-end 108). The instructions performing the GUI functions can be resident or distributed in the operating system, a computer program, or implemented with special purpose memory and processors. Embodiments of the invention may also implement a compiler that allows an application program written in a programming language such as COBOL, C++, FORTRAN, or other language to be translated into processor readable code. After completion, the application may access and manipulate data stored in memory using the relationships and logic that was generated using the compiler. Embodiments of the invention also optionally comprise an external communication device such as a modem, satellite link, Ethernet card, or other device for communicating with other computers.

In one embodiment, instructions implementing the operating system, the computer program, the compiler, and database records, tables and information are tangibly embodied in a computer-readable medium, e.g., data storage devices 132, which could include one or more fixed or removable data storage devices, such as a zip drive, floppy disc drive, hard drive, CD-ROM drive, tape drive, etc. Further, such information may be partitioned across multiple data storage devices 132 as described above. The operating system and the computer program may be comprised of instructions which, when read and executed by a computer, cause the computer to perform the steps necessary to implement and/or use the present invention. Computer programs and/or operating instructions may also be tangibly embodied in memory and/or data communications devices, thereby making a computer program product or article of manufacture according to the invention. As such, the terms "article of manufacture," "program storage device," and "computer program product" as used herein are intended to encompass a computer program accessible from any computer readable device or media.

Those skilled in the art will recognize many modifications may be made to this configuration without departing from the scope of the present invention. For example, those skilled in the art will recognize that any combination of the above components, or any number of different components, peripherals, and other devices, may be used with the present invention.

CONCLUSION

This concludes the description of one or more embodiments of the invention. In summary, the invention describes a method, apparatus, and article of manufacture for parallel execution of SQL from within stored procedures.

The method comprises providing a stored procedure with a class called dispatcher that can take a SQL query and start parallel execution of the query. The query is parallelized. The dispatcher executes the query, sets up the communication links between the various operators in the query, and ensures that all of the results are sent back to the data server that originated the query request. At the data server that originated the request, the dispatcher merges the results of the parallel execution, and produces a single stream of tuples that is fed to the calling stored procedure using an input stream class. The input stream class provides the stored procedure with a simple and easy-to-use interface to access the results of the nested SQL execution.

Other embodiments of the invention include a program storage device tangibly embodying instructions for performing the method steps above on a computer or similar device, and an apparatus for performing the foregoing operations.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of parallel execution of SQL in a stored procedure comprising:
    executing a stored procedure on a first data server;
    determining when a nested SQL command is encountered in the stored procedure;
    transmitting at least a portion of the nested SQL command from the first data server to a query coordinator;
    the query coordinator generating an execution plan that provides for parallel execution of the portion of the nested SQL command;
    transmitting at least a portion of the execution plan from the query coordinator to a plurality of dispatcher instances on a plurality of data servers;
    the plurality of dispatchers executing the transmitted portions of the execution plan on the plurality of data servers;
    the plurality of dispatchers transmitting results from the executed portions of the execution plan to an input stream at an endpoint on the first data server; and
    the stored procedure obtaining the results at the endpoint from the input stream.

2. The method of claim 1 wherein the transmitting at least a portion of the nested SQL command, the transmitting at least a portion of the execution plan, and the query coordinator are transparent to the stored procedure.

3. The method of claim 1 further comprising:
    one or more of said plurality of dispatchers merging results of the execution;
    specifying the endpoint to retrieve the merged results; and
    providing the stored procedure with a mechanism for retrieving the results in the input stream from the endpoint.

4. The method of claim 3 wherein the input stream comprises one or more tuples.

5. The method of claim 1 wherein said generating further comprises:
    a query optimizer generating an ASCII plan; and
    a parallelizer generating a parallel execution plan.

6. A system for parallel execution of SQL in a stored procedure comprising:
    (a) a stored procedure comprised of one or more nested SQL commands;
    (b) a first data server configured to:
        (i) execute the stored procedure;
        (ii) determine when a nested SQL command is encountered in the stored procedure;
        (iii) transmit at least a portion of the nested SQL command from the first data server to a query coordinator;
    (c) a plurality of dispatchers on a plurality of data servers configured to:
        (i) receive portions of an execution plan;
        (ii) execute the received portions of the execution plan on the plurality of the data servers;
        (iii) transmit results from the executed portions of the execution plan to an input stream at an endpoint on the first data server, wherein the stored procedure is further configured to obtain the results at the endpoint from the input stream;
    (d) the query coordinator configured to:
        (i) receive the at least a portion of the nested SQL command;
        (ii) generate the execution plan that provides for parallel execution of the portion of the nested SQL command; and
        (iii) transmitting at least a portion of the execution plan to a plurally of the dispatchers on a plurality of the data servers.

7. The system of claim 6 wherein the query coordinator and the operations of the dispatcher ate transparent to the stored procedure.

8. The system of claim 6 wherein the dispatcher is further configured to merge one or more results of execution of said execution plan.

9. The system of claim 8 wherein the input stream comprises one or more tuples.

10. The system of claim 6 further comprising:
    a query optimizer in the query coordinator, the query optimizer configured to generate an ASCII plan from the portion of nested SQL command; and
    parallelizer in the query coordinator, the parallelizer configured to generate a parallel execution plan from said ASCII plan.

11. An article of manufacture for parallel execution of SQL in a stored procedure comprising:

means for executing a stored procedure on a first data server;

means for determining when a nested SQL command is encountered in the stored procedure;

means for transmitting at least a portion of the nested SQL command from the first data server to a query coordinator;

means for the query coordinator to generate an execution plan that provides for parallel execution of the portion of the nested SQL command;

means for transmitting at least a portion of the execution plan from the query coordinator to a plurality of dispatcher instances on a plurality of data servers;

means for the plurality of dispatchers to execute the transmitted portions of the execution plan on the plurality of data servers;

means for the plurality of dispatchers transmitting results from the executed portions of the execution plan to an input stream at an endpoint on the first data server; and means for the stored procedure to obtain the results at the endpoint from the input stream.

12. The article of manufacture of claim 11 wherein the means for transmitting the portion of the nested SQL command, the means for transmitting at least a portion of the execution plan, and the query coordinator are transparent to the stored procedure.

13. The article of manufacture of claim 11 further comprising:

means for one or mote of said plurality of dispatchers to merge results of the execution;

means for specifying the endpoint to retrieve the merged results; and means for providing the stored procedure with a mechanism for retrieving the results in the input stream from the endpoint.

14. The article of manufacture of claim 13 wherein the input stream comprises one or more tuples.

15. The article of manufacture of claim 11 wherein said means for generating further comprises:

means for a query optimizer to generate an ASCII plan; and means for a parallelizer to generate a parallel execution plan.

* * * * *

UNITED STATES PATENT AND TRADEMARK OFFICE
CERTIFICATE OF CORRECTION

PATENT NO. : 6,507,834 B1
DATED : January 14, 2003
INVENTOR(S) : J.J. Chen et al.

It is certified that error appears in the above-identified patent and that said Letters Patent is hereby corrected as shown below:

Column 18,
Line 47, delete "transmitting", and substitute -- transmit --.
Line 48, delete "plurally", and substitute -- plurality --.
Line 51, delete "ate", and substitute -- are --.

Column 20,
Line 6, delete "mote" and substitute -- more --.

Signed and Sealed this

Twenty-fourth Day of June, 2003

JAMES E. ROGAN
*Director of the United States Patent and Trademark Office*